July 9, 1963 J. L. EDMAN 3,096,616
JET PROPELLED VEHICLE
Filed June 11, 1959 5 Sheets-Sheet 1

INVENTOR.
JAMES L. EDMAN
BY
John A. Young
ATTORNEY

July 9, 1963

J. L. EDMAN 3,096,616

JET PROPELLED VEHICLE

Filed June 11, 1959

INVENTOR
JAMES L. EDMAN
BY John A. Young
ATTORNEY

July 9, 1963   J. L. EDMAN   3,096,616
JET PROPELLED VEHICLE
Filed June 11, 1959   5 Sheets-Sheet 3
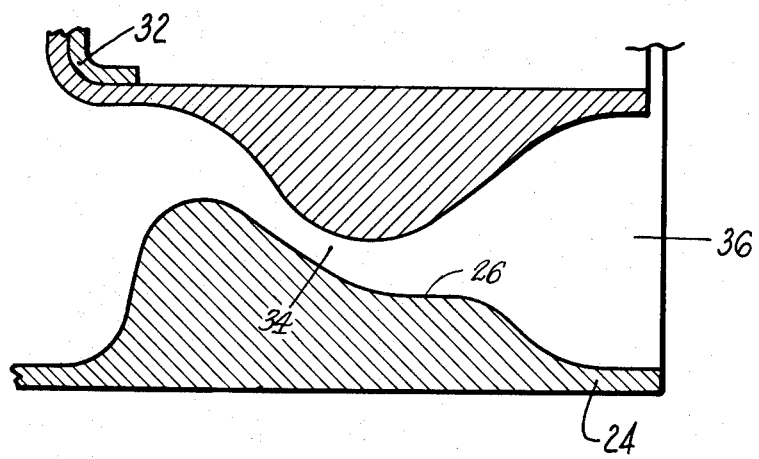
Fig. 4
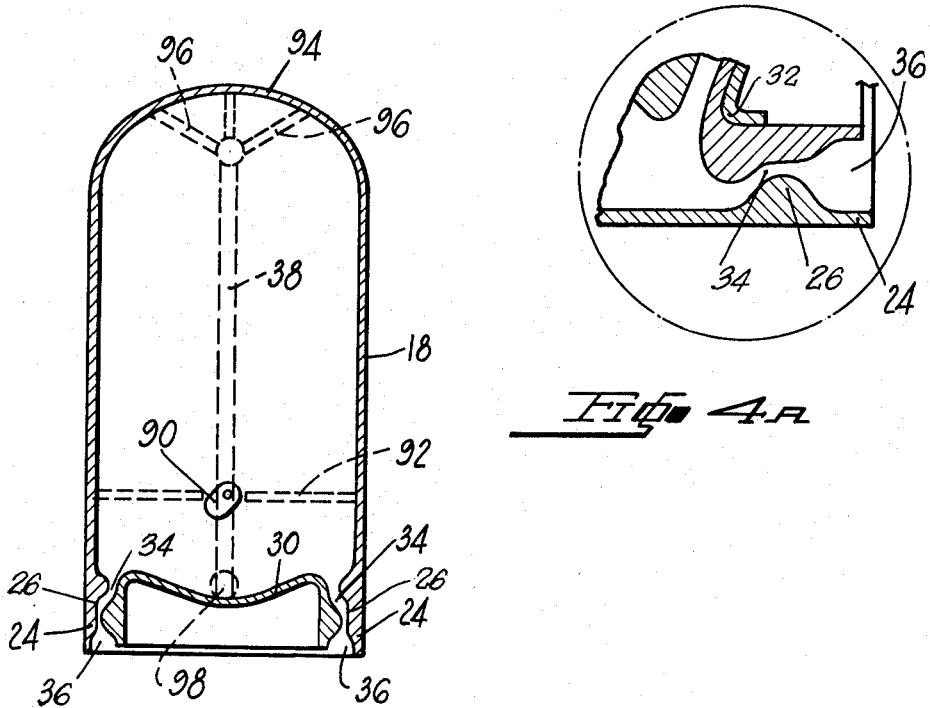
Fig. 4A
Fig. 5
INVENTOR.
JAMES L. EDMAN
BY John A. Young
ATTORNEY July 9, 1963  J. L. EDMAN  3,096,616
JET PROPELLED VEHICLE
Filed June 11, 1959  5 Sheets-Sheet 4
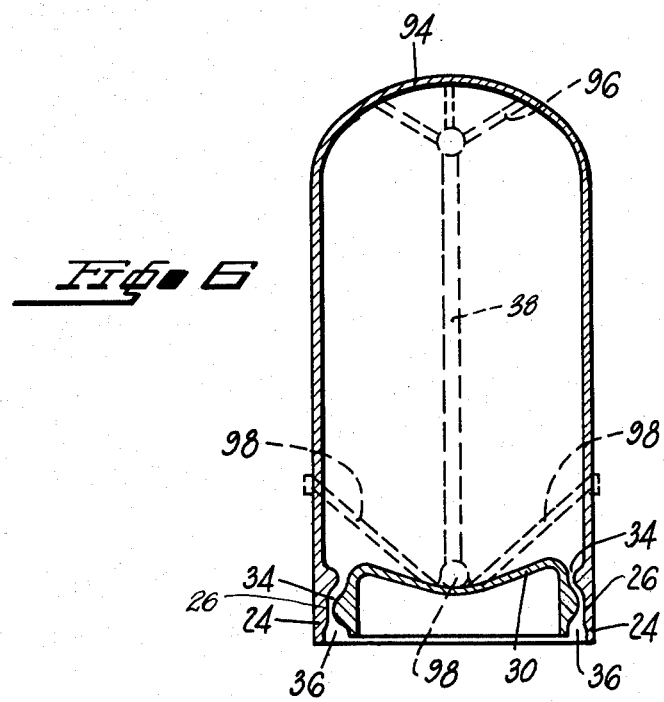
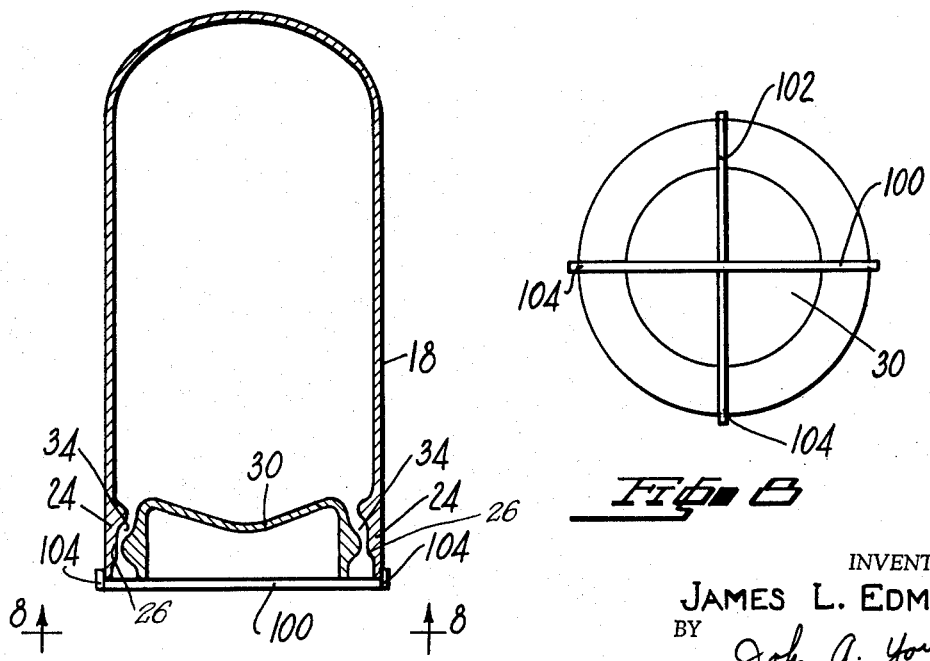
INVENTOR.
JAMES L. EDMAN
BY
ATTORNEY July 9, 1963  J. L. EDMAN  3,096,616
JET PROPELLED VEHICLE
Filed June 11, 1959  5 Sheets-Sheet 5

INVENTOR.
JAMES L. EDMAN
BY John A. Young
ATTORNEY

United States Patent Office 3,096,616
Patented July 9, 1963

3,096,616
JET PROPELLED VEHICLE
James L. Edman, South Bend, Ind., assignor to The Bendix Corporation, South Bend, Ind., a corporation of Delaware
Filed June 11, 1959, Ser. No. 819,712
11 Claims. (Cl. 60—35.6)

This invention relates to a jet propelled vehicle having a combustible charge of propellant which generates a stream of hot motive gases for producing flight.

Heretofore in some jet propelled vehicles, there have been used movable nozzles defining a restricted throat and a cylindrical cone of gases which provide a completely filled cross section of gases providing a source of thrust on the vehicle. With such an arrangement the nozzle is mounted for angular movement at one end so as to dispose the exit flow of gases relatively to the longitudinal axis of the vehicle and thereby controlling the direction of movement of the vehicle. Such an arrangement has been found to have many inherent disadvantages among the chief of which are:

(1) When the exit gases are directed angularly from the axial center line of the vehicle, a portion of the useful thrust is dissipated or lost;

(2) The method of control by means of an angularly movable nozzle depends on the radius of turning or moment arm, the moment arm being subject to constant change owing to a shift of the center of gravity while the fuel is burning, thereby greatly complicating the manner of control;

(3) The continuous cross section flow of motive gas in the nozzle is difficult to control in the magnitude of thrust; and, (4) The mounting structures necessary to support nozzles for angular movement adds considerably to the weight and structural strength requirements for the casing of the vehicle.

While many of the foregoing objections are correctible to some extent, it is one of the primary objects of the present invention to provide a control device which can regulate both the magnitude and direction of thrust on the vehicle without producing substantial thrust losses which are associated with the conventional nozzles previously described and heretofore provided.

It is a further object of this invention to provide a mechanism of control which can regulate the mass flow value so as to maintain a constant thrust on the vehicle regardless of change in fuel characteristics which vary according to the temperature of the fuel, this being especially important in the case of solid propellant fuels. This is of major importance since solid propellant type fuels must either be controlled in their soaking temperature in order to effect the desired performance or suitable provision must be made for regulating the mass flow as it is affected by temperature, burning area, pressure, etc.

It is a further object of the present invention to provide a thrust vector position control means which produces whatever change of direction is desired on the vehicle by relocating the vector position relatively to the center of gravity and without loss of useful thrust.

It is a further object of the invention to effect such change in the thrust vector position relatively to the center of gravity so that the turning force is relatively unaffected by normal changes in the center of gravity from weight losses due to consumption of the fuel.

It is a further object of the invention to provide a thrust magnitude and direction control means which is better adapted for mounting on the jet propelled vehicle and is of less weight and involves less difficulties of mounting on the vehicle.

Other advantages of the present invention over the conventional nozzle structures are that the annular nozzle provides a shorter exit cone for the same expansion ratio of gases. Also, the increased throat surface with the annular nozzle enables improved cooling.

There are, of course, numerous different patterns of burning of the combustible material. It is a distinct advantage and is unique in the present invention, however, that annular patterns of burning of the combustible material may be provided within the combustion chamber and the annular nozzle will allow for "clean" entrance of the gases to the throat of the annular nozzle.

Additional objects and features of the present invention will become apparent from a detailed description of the invention which proceeds with reference to the accompanying drawings, wherein:

FIGURE 4 is an enlarged fragmentary sectional view showing the gas flow through one section of the throat of the nozzle;

FIGURE 4A is a slight modification of the gate and aft end showing how gate movement outwardly of the aft end will restrict rather than enlarge the throat area;

FIGURE 5 is a schematic view of a further embodiment showing how the gate which is positioned at the end of the annular nozzle is radially movable by cam means to control the direction of thrust on the casing and is suspended at the forward end of the casing;

FIGURE 6 is a further embodiment of the invention illustrating different means for supporting the gate at the open end of the casing;

FIGURE 7 illustrates how the gate is supportible at the aft end of the casing instead of suspended from the forward end of the casing as shown in FIGURES 5 and 6;

FIGURE 8 is an end view of the casing looking in the direction indicated by the arrows 8—8 in FIGURE 7;

Figure 9:
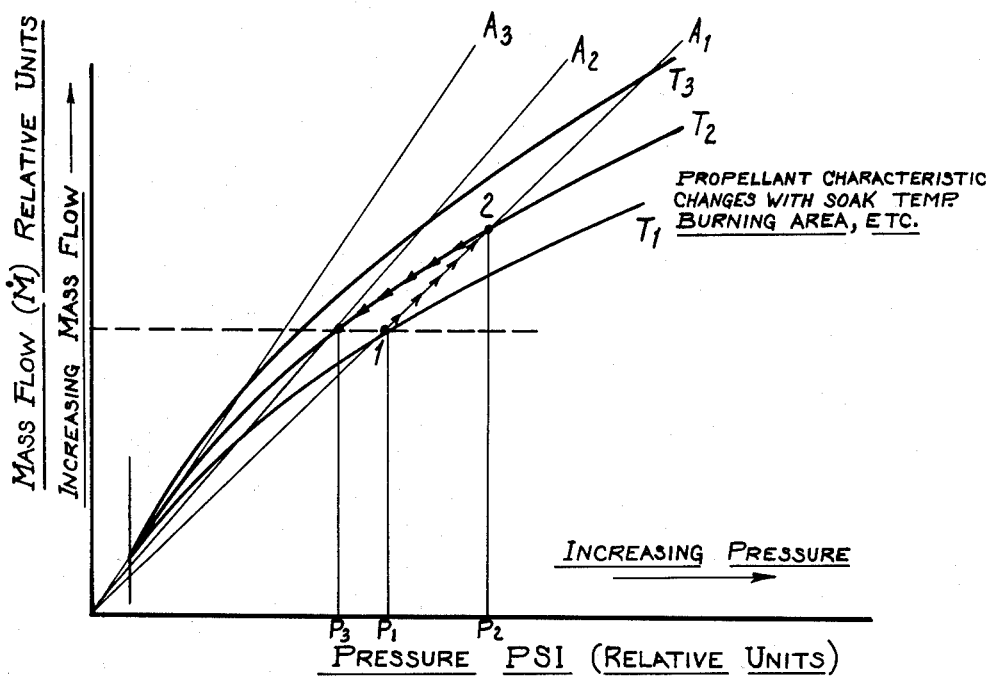
Figure 10:
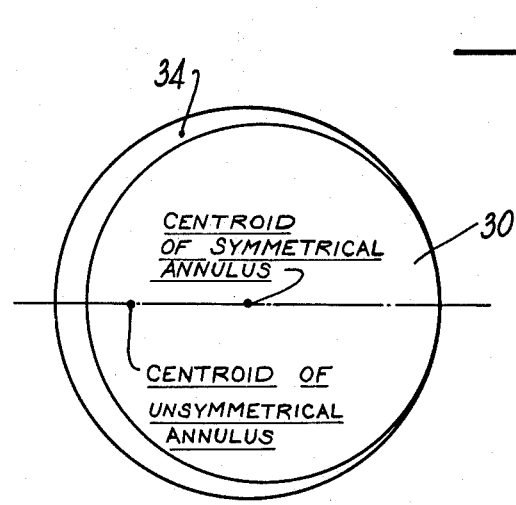

FIGURE 9 is a graph showing how the mass flow is affected by pressure and throat area for different characteristics of the combustible material when subjected to varying soak temperatures, burning area, etc.; and, FIGURE 10 is a schematic view of the annular nozzle in reference to which explanation is made to illustrate how turning movement is obtainable by radial displacement of the gate at the open end of the casing.

Figure 1:
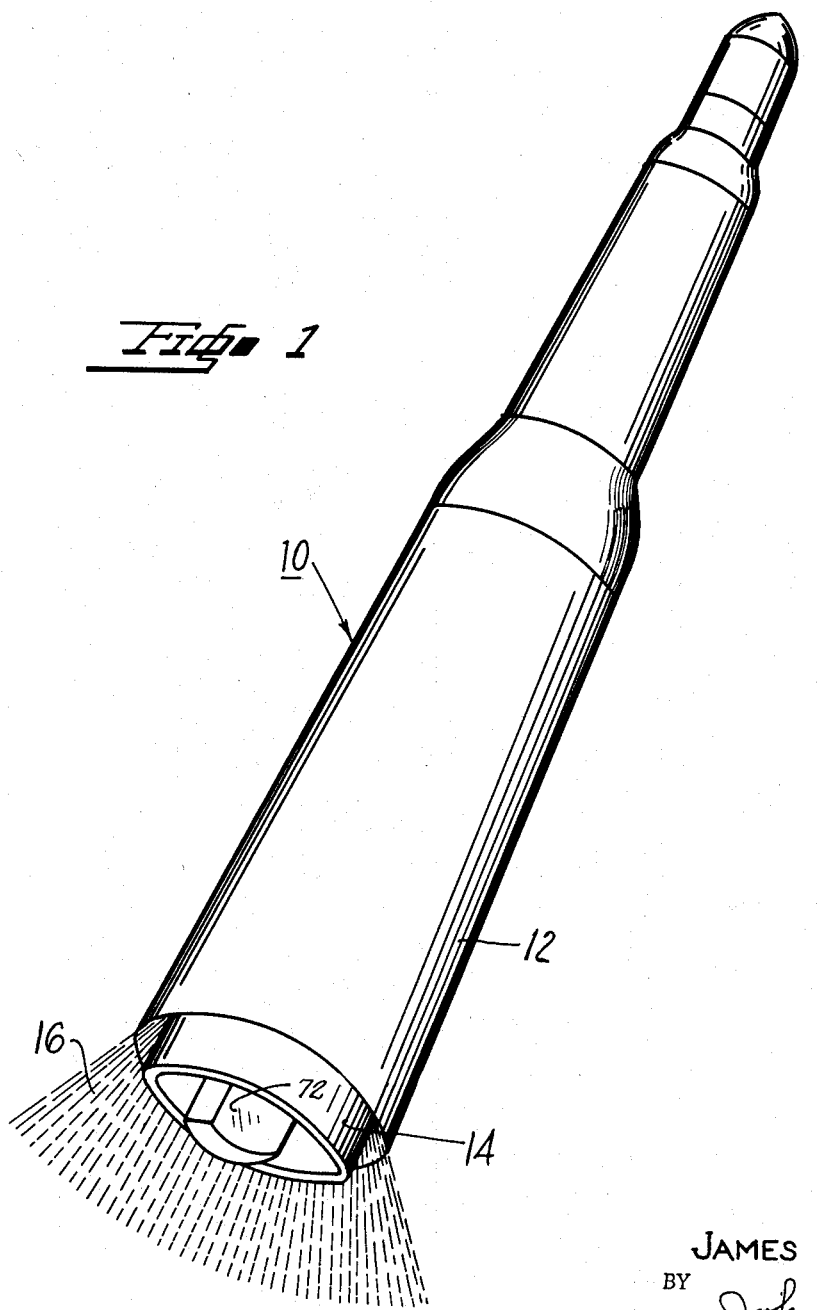
FIGURE 1 is an isometric view of a jet propelled vehicle using the present invention.
Figure 2:
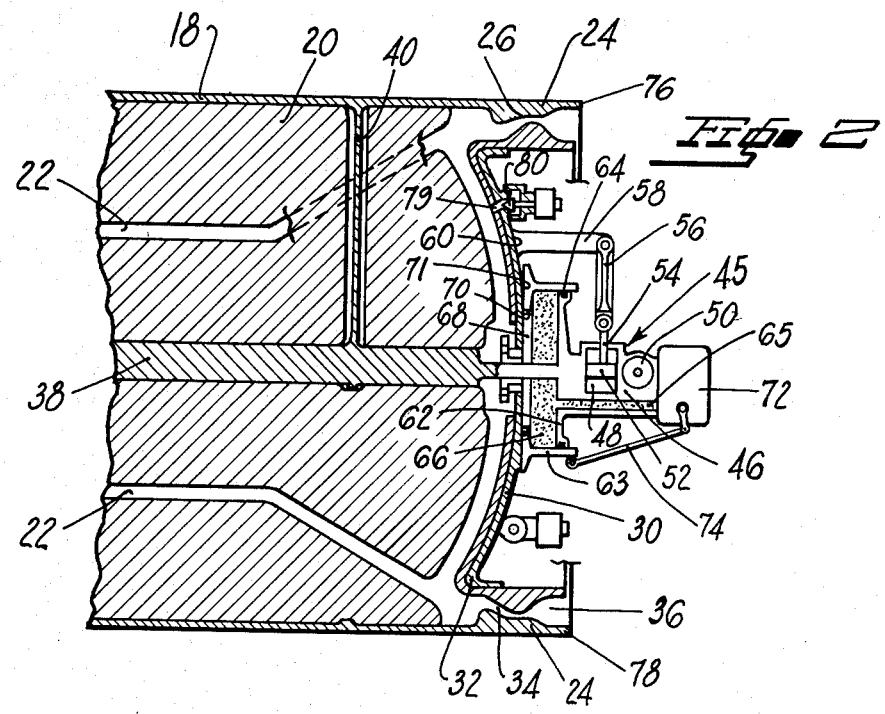
FIGURE 2 is a fragmentary diametrical sectional view at the aft end of the rocket casing and illustrating the casing, propellant charge, annular nozzle and a control mechanism.
Figure 3:
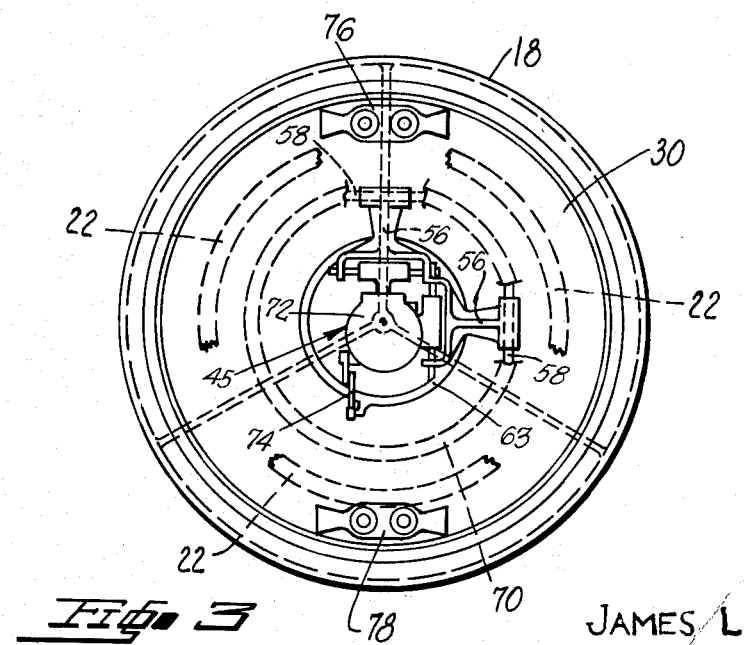
FIGURE 3 is an end view of the casing, annular nozzle and a control mechanism viewed from the right-hand side of FIGURE 2.

Referring now to the drawings and specifically FIGURES 1 to 3, a jet propelled vehicle designated generally by reference numeral 10 has an aft end 12 provided with a rocket engine 14 which generates a stream of hot motive gases expelled under pressure, these gases being indicated schematically by reference numeral 16. These gases provide thrust for moving the vehicle 10. Referring now to FIGURE 2, the rocket engine comprises a casing 18 which is generally a thin structure suitably lined with a heat resistant ablation material (not shown) which provides protection to the casing proper. The casing contains a charge of solid fuel combustible material 20 which may have initial burning surfaces defined by passages 22. The pattern of burning and also the rate of burning is determined to some extent by the construction and location of these passages 22. While the shape and location of these passages 22 may differ and may comprise star shapes, annular cross sectional shapes, cylindrical openings, etc., they are all designed with a view to maintaining a predetermined burning rate which will generate a relatively predictable motive force on the vehicle. While the present invention is in no way limited to a specific pattern or construction to the opening 22, it will be seen that the present invention is especially adapted for the annular cross section cylindrical pattern of opening since clean access of the gases is provided to the annular nozzle.

Just forward of the aft end 24 of the casing there is an enlarged heat and ablation resistant protuberance forming the outer restriction 26 in the open end of the casing. A disk shaped gate 30 is mounted at the aft end of the casing 18 and has an outer periphery 32 which provides in combination with the restriction 26 an annular throat 34 which in turn defines an annular nozzle 36 through which the hot motive gases are expelled during combustion of the material 20. The gate 30 is suspended from the fore end of the casing by a tension rod 38 which extends through the length of the casing 18. The rod 38 is surrounded by the combustion charge 20 and is held against vibratory movement by reinforcing rods 40 which extend radially from the rod 38 and connect with the casing 18.

The gate 30 is movable radially to control the pitch and yaw of the vehicle and by means of an actuator 45 comprising a housing 46 having two cylinder bores 48 and 50 with slidable pistons 52 therein. The two cylinder bores 48 and 50 are located at right angles one to the other and each has a piston rod 54 connected through a link 56 with an arm 58 secured at end 60 to the outer surface of the gate 30. By thus actuating either or both of the pistons 52, it is possible to locate the gate 30 in any radial position relatively to the restriction 26 so that the throat will vary from a concentric annulus to a non-concentric annulus approaching a crescent shape, with a centroid the locus of which is a circular area with a radius equalling the gap of the annulus.

The housing 46 is enlarged at one end to form a fixed wall 62 having a seal 64, the wall 62 being fitted within cylinder wall 63 which defines a chamber 66 having an end wall 68. A hydraulic inlet passage 65 communicates chamber 66 with a hydraulic pressure source and reservoir (not shown). The gate 30 being axially movable relative to the end wall 68 requires a thrust bearing which in the present instance is provided by means of a hydrostatic type bearing. A number of small openings 70 are formed through the end wall 68 so there is a constant limited flow of hydraulic fluid from chamber 66 through the openings 70 and between end wall 68 and gate 30. The seat 71 between end wall 68 and gate 30 being larger in diameter than that of chamber 66 causes a slight pressure drop during said flow. The bearing is located in a stagnant gas region of the combustion chamber and is, therefore, not subject to heavy cooling loads or thermal distortions.

Mounted on the end of housing 46 is a control mechanism 72 which determines the amount of fluid pressure to be developed in chamber 66, the fluid pressure having access to chamber 66 through passage 65. An operating arm 74 connected between control 72 and cylinder wall 63 informs the control of the axial position of gate 30 and this information provides indirectly information as to the cross sectional annular throat area 34, hereafter referred to by the term $A_t$. It is necessary in maintaining a constant mass flow through the nozzle 36 to maintain substantially constant the product of the pressure within the casing ($P_c$) and the throat area ($A_t$). If the mass flow (hereafter referred to by $\dot{M}$) is held constant, the thrust (F) on the rocket is held constant assuming that the burning temperature (T) is constant. These relationships are analyzed as follows:

(1)
$$\dot{M} = \frac{CP_cA_t}{\sqrt{T_c}}$$

where $\dot{M}$ = mass flow through the nozzle,
$C$ = a gas property constant,
$P_c$ = pressure in casing 18,
$A_t$ = effective cross sectional area of the annulus at throat 34 and,
$T_c$ = combustion temperature.

Thus the mass flow $\dot{M}$ will be constant if the product of $P_cA_t$ is held constant since the burning temperature will be made constant as possible and is a function of the fuel material. The fuel material is for all practical purposes homogeneous. Since $\dot{M}$ or mass flow is constant then thrust will be held constant because:

(2)  $F$ (thrust) $= M$ (mass flow) $\times I$ (specific impulse)

the specific impulse being again a characteristic of the fuel and having the dimensions of force (poundals) per pounds of fuel consumption per unit time.

In the operation of the control mechanism, the same mass flow is maintained regardless of change in fuel characteristics change of the combustible material fuel 20. The fuel characteristics including burning rate has an effect on the pressure ($P_c$) within casing 18 and if thrust (F) is to be maintained constant, then suitable regulation must be made in the pressure ($P_c$) and area of the throat ($A_t$) if the thrust is to be regulated.

(3)  $P_c = ar_1^n$ where $P_c$ = pressure in chamber or casing 18,
$a$ = constant,
$r_1$ = burning rate and,
$n$ = fuel constant determined from caloric value of the fuel, from which it can be seen that the mass flow and thrust is definitely affected by fuel characteristics change because the pressure $P_c$ is affected (see Equations 1, 2). The burning rate in turn is related also to the burning area ($A_b$) and the throat area ($A_t$) in accordance with the approximate relation (4)
$$r_1 \approx \frac{(A_b)}{A_t} K$$

where $r_1$ = burning rate,
$A_b$ = burning area,
$A_t$ = throat area and,
$K$ = constant.

During operation of the rocket engine, the pressure ($P_h$) in chamber 66 effective over the area of the end wall ($A_h$) is balanced against the pressure ($P_c$) within the casing 18 acting over the area ($A_g$) of the gate. Thus, (5)  $P_hA_h = P_cA_g =$ a constant $c_1$ and since the areas $A_h$ and $A_g$ are constant then nozzle throat area $A_t$ is adjusted to hold pressure within casing at a fixed ratio with the hydraulic pressure $P_h$ in chamber 66. For example, movement of gate 30 toward the right (FIGURE 2) to reduce pressure ($P_c$) will change the value of $A_t$. Also change in burning area $A_b$ will affect the burning rate logarithmically (see Equation 4) and this in turn affects logarithmically the pressure in casing 18

(Equation 3) to affect the mass flow (Equation 1) and thereby control change of thrust (Equation 2). It is, therefore, necessary to sense at least indirectly and provide as a separate value the throat area $A_t$, this being accomplished by operating arm 74 which senses the axial position of gate 30 as before described. The axial position of the gate is related to $A_t$ as previously described.

Since the pressure within casing 18 is maintained at a fixed proportion to hydraulic pressure (Equation 5), it is possible to maintain the same thrust or control thrust at different pressures arising from change of propellant characteristics but only if the throat area is sensed (at least indirectly) as a separate value. As a result the product of casing pressure $P_c$ and throat area $A_t$ is substantially constant and the resulting mass flow and thrust are constant (or controlled). As shown in FIGURE 2, the pressure $P_c$ in the casing is increased by moving the gate toward the right and the control mechanism functions to oppose such pressure $P_c$. But the gate can also be arranged as shown in FIGURE 4A to restrict the throat responsively to outward movement, there being other control mechanisms operations to position the gate with this arrangement.

Referring to FIGURE 9, to maintain the same mass flow for a change of propellant characteristic owing to different soak temperatures, changes of burning area, etc., the control mechanism will change the throat area and pressure to an equilibrium pressure and area obtained at the intersection of a horizontal line through the requested mass flow with the new propellant characteristic value. The control mechanism accomplishes this because it senses pressure and throat area, the latter being indirectly established by means of direct sensing of axial position of the gate. Should the burning rate increase from $T_1$ to $T_2$, then the pressure will surge upwardly on the $A_1$ line until it reaches the point of intersection with $T_2$. The new pressure value $P_2$ enlarges the area to $A_2$ at which burning rate $T_2$ maintains the mass flow with the newly established pressure $P_3$ and area $A_3$. Between points ① and ② of the graph there will occur some seeking of the control mechanism but the control mechanism will continue to function until it establishes the new value of pressure and throat area at which thrust is maintained for the different rates.

Referring next to FIGURE 10, the steering of the vehicle will be explained. The pistons 52 are operated in accordance with a directional mechanism (not shown) which in turn causes movement of the gate 30 in a radial direction to vary the cross sectional shape of the annular throat 34 and nozzle 36. For example, in FIGURE 10 the gate 30 has been moved to the right of the aft end 24 to be at a point of tangency with the casing and the cross sectional area of the throat has changed from annular to crescent shape. Regardless of the position of the gate 30 radially from the center of the aft end of the casing 18, the thrust generation is substantially undiminished, this being in contrast with the angularly movable conventional nozzles which dissipate a part of the forward thrust when they are moved angularly from the longitudinal center line of the vehicle. What is changed by movement of the gate is that the centroid of the cross sectional area is displaced radially so that the axial thrust vector is shifted from the longitudinal axis of the vehicle 10. The amount of shift is the turning moment lever arm which produces change in the pitch or yaw or both on the vehicle. The lever arm remains the same during consumption of the fuel, the center of gravity merely moving along the longitudinal axis of the missile or space vehicle. Since the lever arm L remains constant the forward thrust remains constant with none dissipated by the extent of the lever arm, this greatly simplifies the matter of direction sensing and direction control to operate the pistons 52. To control roll of the vehicle, auxiliary jets 76 and 78 are mounted on the gate 30, each jet including an inlet port 79 and valve 80 for passing a part of the gas generated within casing 18 through the auxiliary jets 76, 78.

Referring next to FIGURE 4 which is an enlarged fragmentary detail view of the annular nozzle 34 and throat 35, the gas flow is subsonic in the region just upstream of the throat 34. As the gas flow enters the throat 35 it becomes sonic velocity and is thereafter expanded by entry into the enlarged nozzle region 36. It is characteristic of the sonic speed gas to accelerate under expansion. The velocity of the gas determines or has a substantial effect on the efficiency of the jet, the general rule being that the higher the velocity of the exit flow the greater the efficiency. To secure this efficiency of performance (within limits determined by exit pressure) the gas must undergo an expansion according to an expansion ratio, a value derived from a comparison of the cross sectional area of throat to cross sectional area of nozzle exit. It forms an important part of the invention that the necessary expansion ratio can be obtained with only a very short nozzle length. The reason for this is that the cross sectional area of the throat 34 (FIGURE 4) is small and within only a very short length, the throat may be expanded to a nozzle exit area giving the desired expansion ratio. Accordingly, the nozzle structure need not be of great length which adds to the bulk and weight of the vehicle 10.

Referring next to FIGURE 5, the steering of the vehicle 10 may be accomplished swinging the gate 30 at the aft end 24 of the casing by means of a cam 90 which is rotated by a guidance means (not shown) to engage the fixed member 92. The gate 30 is suspended on a tension rod 38 secured to the forward end 94 of the casing 18 through cables 96 or the like. When the gate 30 which is secured turnably at 98 to the rod 38 is displaced radially by cam 90, it will vary the concentric cross-sectional annular throat 34 to a nonconcentric annulus approaching a crescent shape, i.e., it will no longer be of uniform gap around the circumference of the throat 34. Such variance will cause a shift of the centroid of the throat annulus, likewise displacing the line of thrust relatively to the longitudinal center line of the casing and producing a turning effect on the vehicle 10.

While there are certain advantages inherent in suspending the gate 30 from the forward end of the casing in that less tensile force is exerted on the casing 18, it is also possible to suspend the gate 30 by a combination of radial and longitudinal mounting as shown in FIGURE 6. For example, the gate 30 may be connected through rod 38 to the forward end 94 of the casing through a number of cables 96 or the like. In addition to the rods 38 and cables 96, a number of rods 98 may be fastened between the gate and the wall of the casing toward the aft end. The rods 98 may be further adapted for moving the gate 30 to achieve steering of the vehicle 10.

Also, referring to FIGURES 7 and 8 the gate 30 can be supported at the aft end 24 of the casing 18 by means of two cross beams 100 and 102 which are fastened at their ends 104 with the casing 18. Although the cross beams extend across the annular nozzle and are, therefore, subject to the heat from the blast of gases, they will not fail if suitably coated with an insulating ablation-resistant material which will prevent erosion to the point of failure.

From these different embodiments will be seen that the matter of supporting the gate within the open end of the casing is a matter of design preference which depends upon the strength of the casing and the weight of the mounting structure which is permitted. For example, in FIGURE 7 while the cross beam method for mounting the gate imposes greater stress on the casing, it is also a lighter weight mounting for a minimum ratio of rocket motor plus groin to groin.

Although certain selected embodiments of the invention have ben chosen to illustrate the invention, it will be understood that these are in no way restrictive thereof. It is intended that such revisions and variations of the invention as are reasonably to be expected on the part of those skilled in the art and which incorporate the herein disclosed principles will be included within the scope of the following claims.

What is claimed is:

1. A self-propelled missile comprising a casing having a combustible charge of propellant fuel therein, the aft end of said missile being open and having an annular restriction constructed therein, a gate disposed within said aft end and having an outer periphery spaced from said annular restriction to define an annular nozzle having a throat defined by the opposed surfaces of said restriction and gate periphery, means secured to said casing and supporting said gate at the aft end of said casing, a first means responsive to pressure within said casing for moving said gate within said aft end to restrict or enlarge the area of said annular nozzle to control the thrust developed from hot motive gases flowing through said annular nozzle, a second pressure responsive means for moving said gate radially to establish the line of thrust relatively to the longitudinal axis of the missile but parallel therewith whereby said missile is directed in its flight, and means secured to both said casing and gate and responsive to the cross sectional area of said annular nozzle for axially disposing said gate relatively to said restriction and thereby controlling the specific impulse developed from the motive gases flowing through said nozzle regardless of the burning rate of fuel in said casing.

2. A jet propelled rocket comprising a casing having a charge of solid combustible propellant therein and a discharge opening at the aft end of said rocket, an annular restriction at the inner surface of said casing surrounding said discharge opening, a gate extending across said discharge opening to direct the flow of hot motive gases through an annular nozzle opening defined by the clearance between said restriction and gate, means for supporting said gate for longitudinal floatable movement therein, a first pressure responsive means associated with said means supporting said gate operating means biased against the hot motive gases to position said gate relatively to said restriction and thereby controlling the cross sectional area of said nozzle to regulate the thrust on said rocket, a second pressure responsive means for moving said gate radially to vary the cross sectional configuration of said annular nozzle and relocate the line of thrust on said rocket which is disposed at the centroid of the cross sectional area of said nozzle which remains the same to thereby maintain the same magnitude of thrust on said rocket to control the line of movement of said rocket, and means responsive to the total effective opening area of said nozzle to effect a given thrust regardless of burning rate of said combustible propellant.

3. A rocket engine for a space vehicle comprising a casing having a charge of combustible solid propellant therein and an opening at the aft end of said casing providing an outlet for hot motive gases generated from said solid propellant, means forming a disc-shaped barrier within said opening to direct the flow of propellant gases through said opening, an annular nozzle portion of said opening having a throat defined by the adjacent opposing surfaces of said casing and barrier, means for mounting said barrier for both radial and longitudinal movement within said opening, means having a thrust connection with said mounting means and responsive to generation of thrust from combustion of said propellant for moving said barrier longitudinally within said opening to control the area of said annular nozzle thereby regulating the thrust on said vehicle, control means responsive to the effective area of said annular nozzle for maintaining a substantially constant mass flow and thrust for substantially constant specific implse, and means for actuating said dis-shaped barrier radially to displace said discshaped barrier within said opening to regulate the configuration of said annular nozzle thereby directing the line of thrust on said vehicle whereby said vehicle is guided.

4. The rocket engine structure in accordance with claim 3 wherein said means for mounting said barrier comprises a force transmitting member secured thereto and extending longitudinally through the casing to be affixed to said casing at the forward end thereof, and means extending radially from said force transmitting member and having a force connection with said casing to prevent movement of said force transmitting member.

5. The rocket engine structure in accordance with claim 3 comprising means for mounting said barrier comprising radially extending members having connections at one end through said barrier and at the other end to the aft portion of said casing.

6. For use in a jet propelled vehicle, a control mechanism for regulating the magnitude and direction of thrust comprising means defining an annular nozzle and including a centrally disposed disc-shaped barrier, means for mounting said disc-shaped barrier to provide for axial movement enlarging or diminishing the effective area of said annular nozzle defined by the space between the outer periphery of said barrier and the opposing surface of said means affecting the magnitude of said thrust and for radial movement to modify the symmetrical shape of said annular nozzle thereby affecting the direction of thrust, a backing disposed at the side of said barrier opposite the side exposed to said motive gases and opposing the thrust thereof for limiting axial displacement of said barrier in the direction of line of thrust of said gases, fluid pressure means having force transmitting connections with said barrier for displacing said barrier towards and away from said backing to enlarge or diminish the effective area of said nozzle, means responsive to the effective area of said nozzle and effective to operate said fluid pressure means for maintaining a substantially constant mass flow through said nozzle and thereby a substantially constant thrust on said vehicle, and fluid pressure responsive actuating means having mounting connections with said backing and transmitting connections with said barrier for disposing said barrier radially to affect the configuration of said annular nozzle and thereby locate the line of thrust directing the line of movement of said vehicle.

7. A control mechanism for use in combination with jet propelled vehicles to regulate the magnitude and direction of thrust on said vehicle, comprising means defining an annular nozzle and including a movable barrier mounted for both axial and radial movement to regulate the effective cross sectional area and configuration of said nozzle, first actuating means responsive to the effective cross sectional area of said nozzle to maintain the mass flow of propellant gases therethrough, and second actuating means for locating said barrier radially to affect the configuration of said nozzle determining the line of thrust of said propellant gases.

8. The control mechanism structure in accordance with claim 7 including auxiliary jets having thrust connections with said barrier and located in a plane transverse to the main flow of propellant gases to develop turning thrust in a plane transversely to the main flow of propellant gases.

9. The control mechanism in accordance with claim 7 including means for sensing the motive gases flowing through said nozzle, said first actuating means having fluid pressure connections with said sensing means to control the effective area of said nozzle to maintain substantially constant thrust independently of rate of combustion generating said gases.

10. In a rocket engine having a longitudinal axis and an outlet with an annular restriction therein, a discshaped gate proportioned to fit within said outlet and having an outer periphery of greater diameter than the diameter of the opening provided by said annular restriction and which defines in cooperation with said restriction an annular thrust nozzle, a first means responsive to the pressure within the engine for locating said gate toward and away from said restriction to define the effective cross sectional area of said nozzle controlling the magnitude of thrust on said rocket, and a second means for locating said gate radially to define the configuration of said nozzle unaffecting its area and thrust magnitude but locating the centroid of said nozzle relatively to the longitudinal axis of said rocket.

11. The rocket structure in accordance with claim 10 including a third means sensitive to the effective area of said nozzle and having thrust connections with said gate to actuate said gate to position the gate relatively to said restriction whereby substantially constant thrust is maintained on the rocket.

References Cited in the file of this patent

UNITED STATES PATENTS

| | | |
|---|---|---|
| 2,412,173 | Pope | Dec. 3, 1946 |
| 2,822,755 | Edwards et al. | Feb. 11, 1958 |
| 2,857,119 | Morguloff | Oct. 21, 1958 |
| 2,865,169 | Hausmann | Dec. 23, 1958 |
| 2,936,578 | Chamberlain | May 17, 1960 |
| 2,943,444 | Baxter | July 5, 1960 |
| 2,952,124 | Pearson | Sept. 13, 1960 |

FOREIGN PATENTS

| | | |
|---|---|---|
| 691,302 | Great Britain | May 13, 1953 |
| 714,892 | Great Britain | Sept. 1, 1954 |